Figure 1:
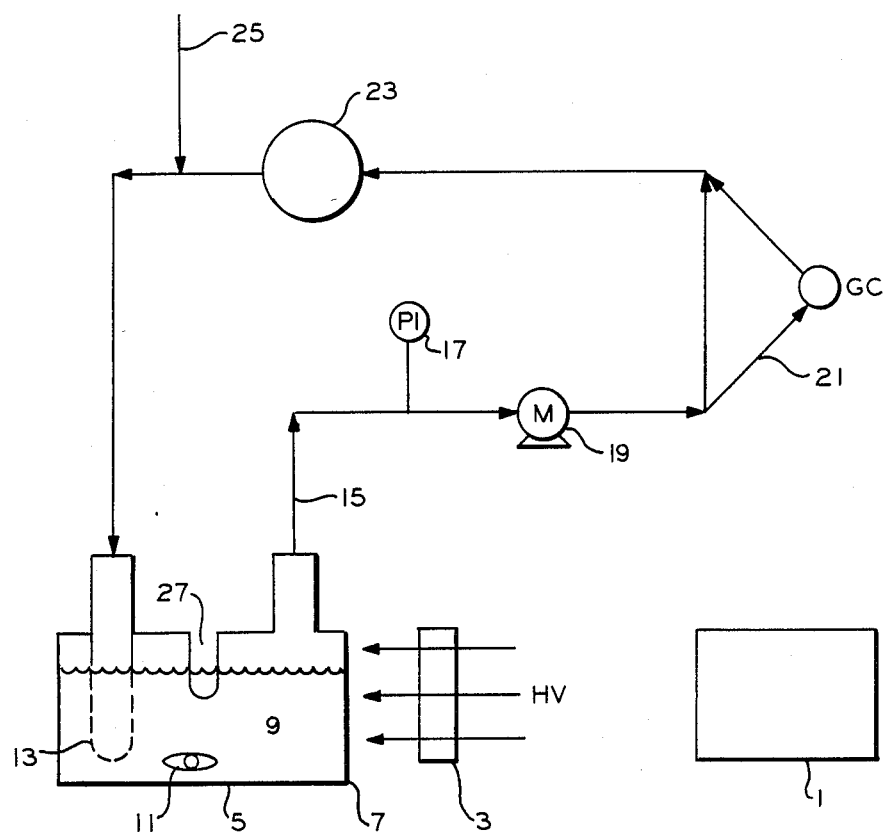

United States Patent [19]

Kolts et al.

[11] Patent Number: 4,610,766

[45] Date of Patent: Sep. 9, 1986

[54] PHOTOCHEMICAL PRODUCTION OF HYDROGEN FROM HYDROGEN SULFIDE

[75] Inventors: John H. Kolts; Joseph E. Figard; James B. Kimble; Donald H. Kubicek, all of Bartlesville, Okla.

[73] Assignee: Phillips Petroleum Company, Bartlesville, Okla.

[21] Appl. No.: 743,547

[22] Filed: Jun. 11, 1985

[51] Int. Cl.[4] ............................................. B01J 19/12
[52] U.S. Cl. .................................................. 204/157.52
[58] Field of Search ................. 204/157.1 R, 157.1 P, 204/157.52

[56] References Cited

U.S. PATENT DOCUMENTS 4,090,847  5/1978  Becker et al. ...................... 23/230 R
4,094,751  6/1978  Nozik ................................... 204/80

FOREIGN PATENT DOCUMENTS 0066540 12/1982 European Pat. Off. ..... 204/157.1 R

OTHER PUBLICATIONS

Chemical and Engineering News, pp. 40–42, Jul. 27, 1981, "Visible Light Cleaves Hydrogen Sulfide".

Primary Examiner—Howard S. Williams

[57] ABSTRACT

Hydrogen is produced by irradiating a solution of $H_2S$ dissolved in alkaline liquid medium using light in the visible range.

8 Claims, 2 Drawing Figures

A = $N_2$ ATMOSPHERE; SOLUTION SATURATED WITH $H_2S$
B = $H_2S$ ATMOSPHERE

PHOTOCHEMICAL PRODUCTION OF HYDROGEN FROM HYDROGEN SULFIDE

BACKGROUND OF THE INVENTION

This invention relates to photolysis. In one of its aspects this invention relates to the production of hydrogen from hydrogen sulfide. In a further aspect of this invention it relates to the photolysis of hydrogen sulfide to produce hydrogen. In another of its aspects it relates to the photolysis of hydrogen sulfide in liquid solutions. In still another aspect of this invention it relates to the presence of alkaline compounds in liquid solutions useful in the photolysis of hydrogen sulfide.

The photolysis of hydrogen sulfide using light in the visible range is important because it makes possible the use of our most abundant and cheapest source of energy—the sun. It is readily recognizable that the ability to destroy a noxious pollutant by treating an aqueous solution of the pollutant with solar energy can be an economical advantage. It is also recognizable that the use of hydrogen sulfide as an economical source of hydrogen and sulfur can also be of great importance.

It is therefore an object of this invention to provide a method for the photolysis of hydrogen sulfide to produce hydrogen. It is another object of this invention to provide a process for the production of hydrogen that is dependent upon the use of solar energy. It is still another object of this invention to provide a method for the destruction of hydrogen sulfide that is ecologically sound and that is dependent on the use of solar energy.

Other aspects, objects and the various advantages of this invention will become apparent upon study of this specification, the drawings, and the appended claims.

STATEMENT OF THE INVENTION

According to this invention, a method is provided for producing hydrogen from hydrogen sulfide by photolysis in which hydrogen sulfide is dissolved in an alkaline liquid medium to provide a solution which is then irradiated with light in the visible range.

For the purposes of this invention, visible light is defined as radiation having a wavelength of about 300 nanometers (nm) to about 770 nm. The visible range of radiation overlaps ultra-violet radiation at the end of the range with shorter wavelengths and overlaps the infrared range at the upper end of longer wavelengths. A preferred range of wavelengths for radiant energy useful in the invention can be described as about 300 nm to about 700 nm with the most preferred range of about 300 nm to about 400 nm.

Although the alkaline liquid medium in which hydrogen sulfide is dissolved in the process of this invention is preferably an aqueous solution of an alkaline compound, the alkaline liquid medium can be any liquid medium that is of alkaline pH and in which hydrogen sulfide can be dissolved. Among suitable solvents for hydrogen sulfide which can be made alkaline by the addition of a soluble alkaline compound are alkylpyrrolidones such as N-methylpyrrolidone and N-ethylpyrrolidone and aliphatic alcohols, preferably those having 1 to 5 carbon atoms.

Although any alkaline compound compatible with solvents in which hydrogen sulfide can be dissolved are useful in the present invention, the hydroxides of alkali and alkaline earth metals are particularly useful because of their availability and relative inexpensiveness. Ammonium hydroxide also falls within the particularly useful category because of availability and inexpensiveness.

Figure 2:
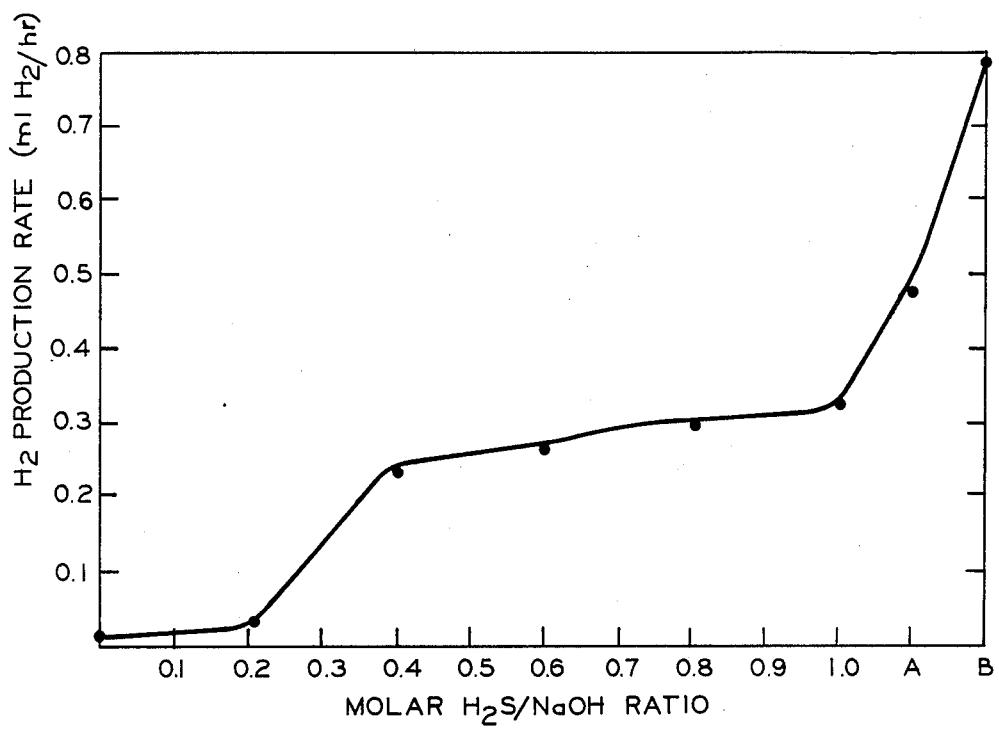

The process of this invention can best be understood by study of the examples set out below in conjunction with the drawing in which:

FIG. 1 is a line representation of the apparatus used to simulate the process of this invention, and FIG. 2 is a graphical representation of the effect of the molar ratio of $H_2S:OH^-$ in an aqueous 8N (8 normal) NaOH solution on the production $H_2$ gas.

The following examples should be taken as illustrative of the present invention and should not be viewed as restrictive.

EXAMPLE I

In this example the experimental setup for the production of hydrogen gas by photo-induced decomposition of hydrogen sulfide solutions is described.

The apparatus used for the photolysis is shown in FIG. 1. An Oriel Corporation 250 watt or 90 watt high pressure mercury lamp 1 was employed as the light source. In those examples where the 90 watt lamp was used, data have been normalized to the photon flux of the 250 watt lamp. The emitted light passed through a Pyrex glass filter 3 (in addition to the Pyrex window of the photolytic cell as described below) so as to filter out all uv radiation below a wavelength of about 290 nanometers (nm). The absolute quantum efficiencies of the 250 watt mercury lamp were calibrated by Reineckate's Salt Actinometry (described in *Journal of The Americal Chemical Society*, 88, pages 394 ff., 1966) using three band pass filters. The calibrated photon flux for each of the filters was:

| Bandpass (nm) | Flux (quanta/min.) |
| --- | --- |
| 440 | $3.1 \times 10^{18}$ |
| 400 | $2.0 \times 10^{19}$ |
| 350 | $1.2 \times 10^{19}$ |

Visible light that passed through filter 3 entered the photolytic cell 5 through Pyrex window 7. The $H_2S$-containing solution 9 to be photolytically decomposed was stirred by means of magnetic stirring bar 11. The $H_2S$-containing feed gas was introduced through bubbler tube 13, the $H_2$-containing product gas exited through line 15 equipped with a pressure gauge 17 and a gas recirculation pump 19. A small portion of the product gas was diverted to a gas chromatograph through GC loop 21 for analysis of the product gas stream.

The major portion of the product gas pumped into a 250 cc gas ballast container 23 and was recycled to the photolytic cell 5. Fresh $H_2S$ was introduced through auxiliary gas inlet 25. The photolytic cell was equipped with a thermocouple well 27 for measuring the temperature of the solution (generally 26°–34° C.).

EXAMPLE II

This example illustrates the production of $H_2$ gas by photo-induced decomposition of aqueous NaOH solutions which had been saturated with $H_2S$ employing the apparatus described in Example I. The temperature for all runs was about 30°–35° C.; run times were 6–7 hours. Table I summarizes $H_2$ production rates as a function of the NaOH concentration.

TABLE 1

| NaOH Concentration (mole/l) | $H_2$ Production Rate (ml/hours) |
|---|---|
| 0.0 | 0.0 |
| 1.0 | 0.41 |
| 2.0 | 0.66 |
| 4.0 | 0.87 |
| 6.0 | 0.70 |
| 8.0 | 0.85 |

Data in Table I show that no $H_2$ is generated from solutions of $H_2S$ in neutral water. It is believed that concentration of at least about 0.1 mole of NaOH per liter of solution (0.1 g-equivalents/l of OH—; 0.1N) is required for any significant photolysis of $H_2S$ and hydrogen production. Using NaOH a molarity of about 2–8 moles/l is considered a preferred range for maximum $H_2$ generation.

EXAMPLE III

The effect of the molar ratio of $H_2S$ to $OH^-$ in an aqueous 8N NaOH solution on the production of $H_2$ gas, in accordance with the procedure of Example I is illustrated by FIG. 2, which shows that a ratio of at least about 0.2 moles $H_2S$ per mole NaOH was required for any appreciable $H_2$ production. Preferably, this ratio was at least about 0.4 moles $H_2S$ per mole NaOH. Maximum hydrogen production was attained when said ratio was 1.0 and above. It is believed that a complex involving $SH^-$ ions and $H_2S$ may be formed at high $H_2S$:NaOH ratios, and that these complexes lower the energy barrier for the decomposition of $H_2S$.

EXAMPLE IV

This example ilustrates the use of other alkaline substances in the photolysis of $H_2S$. Data in Table II show the counter-ions of 2N aqueous base solutions were not a critical parameter in the photolysis of dissolved $H_2S$, in accordance with the procedure of Example I.

TABLE II

| Base | $H_2$ Production Rate (ml/hr) |
|---|---|
| NaOH | 0.59 |
| LiOH | 0.51 |
| $NH_4OH$ | 0.48 |

A solution of 30 ml N-methyl-2-pyrrolidone (NMP) and 0.1–0.2 g NaOH was used to dissolve about 500 ml gaseous $H_2S$ (at STP conditions). Photolysis of this solution, in accordance with the procedure of Example I, produced 0.21–0.23 ml $H_2S$ per hour. When no NaOH was added to NMP, no $H_2$ was generated by photolysis.

We claim:
1. A method for producing $H_2$ and $H_2S$ comprising:
   (1) dissolving $H_2S$ in in an alkaline liquid medium to provide a composition consisting essentially of $H_2S$ dissolved in an alkaline liquid medium, and
   (2) irradiating said composition consisting essentially of $H_2S$ dissolved in said alkaline liquid medium with light in the visible range.
2. A method of claim 1 wherein said alkaline liquid medium is an aqueous solution of alkaline compound.
3. A method of claim 2 wherein said alkaline compound is chosen from NaOH, LiOH and $NH_4OH$.
4. A method of claim 3 wherein said alkaline compound is NaOH.
5. A method of claim 4 wherein the molarity of said aqueous solution of alkaline compound is in a range of about 2 to about 8 moles NaOH per liter solution.
6. A method of claim 1 wherein said alkaline liquid medium is a solution of alkaline compound in N-methylpyrrolidone.
7. A method of claim 6 wherein said alkaline compound is NaOH.
8. A method of claim 7 wherein the molarity of said solution of alkaline compound is in a range of about 2 to about 8 moles NaOH per liter solution.

* * * * *

UNITED STATES PATENT AND TRADEMARK OFFICE
CERTIFICATE OF CORRECTION

PATENT NO. : 4,610,766

DATED : SEPTEMBER 9, 1986

INVENTOR(S) : JOSEPH E. FIGARD, et al

It is certified that error appears in the above-identified patent and that said Letters Patent is hereby corrected as shown below:

Claim 1, column 4, line 16, after "$H_2$" "and" should be deleted and "from" should be inserted.

Signed and Sealed this

Seventh Day of June, 1988

Attest:

DONALD J. QUIGG

*Attesting Officer*   *Commissioner of Patents and Trademarks*